(12) United States Patent
Drury et al.

(10) Patent No.: US 7,463,258 B1
(45) Date of Patent: Dec. 9, 2008

(54) EXTRACTION AND RENDERING TECHNIQUES FOR DIGITAL CHARTING DATABASE

(75) Inventors: Todd P. Drury, Portsmouth, RI (US); Douglas B. Maxwell, Woodworth, LA (US); Richard R. Shell, Riverside, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 574 days.

(21) Appl. No.: 11/185,084

(22) Filed: Jul. 15, 2005

(51) Int. Cl.
*G06T 15/30* (2006.01)
(52) U.S. Cl. .................. 345/423; 345/419; 345/420; 707/102
(58) Field of Classification Search .............. 345/419; 707/7, 202
See application file for complete search history.

(56) References Cited

U.S. PATENT DOCUMENTS

| | | | |
|---|---|---|---|
| 5,551,019 A | * | 8/1996 | Izawa et al. ............... 707/7 |
| 6,177,943 B1 | * | 1/2001 | Margolin .................. 345/419 |
| 6,515,663 B1 | | 2/2003 | Hung et al. |
| 6,556,194 B1 | | 4/2003 | Shiono |
| 6,563,500 B1 | | 5/2003 | Kim et al. |
| 6,606,089 B1 | | 8/2003 | Margadant |
| 2002/0184245 A1 | * | 12/2002 | MacPherson ............. 707/202 |

* cited by examiner

*Primary Examiner*—Xiao M Wu
*Assistant Examiner*—Phi Hoang
(74) *Attorney, Agent, or Firm*—James M. Kasischke; Michael P. Stanley; Jean-Paul A. Nasser (57) ABSTRACT

Disclosed is a method for extracting and rendering data from digital charting databases. The software method integrates and combines bathymetric/topographic data from several sources into a stream of three-dimensional data points, creating a triangle surface mesh, and dividing it into pieces along arbitrary lines to create regularly sized and shaped areas for efficient storing and rendering. The method works by forming an initial triangle mesh of the area and then refining the mesh by incrementally adding each point to the mesh, until a full mesh representation is achieved. The large single file is then broken down into discrete geographic regions, and the region data is converted into a standard file format for viewing and/or processing.

6 Claims, 13 Drawing Sheets

EXTRACTION AND RENDERING TECHNIQUES FOR DIGITAL CHARTING DATABASE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a general-purpose methodology for extracting and rendering data from digital charting databases and, more particularly, to a method for integrating and combining bathymetric/topographic data from several sources operating on ordinary desktop personal computers.

2. Description of the Prior Art

A necessary prerequisite to display a 3-dimensional (3-D) tactical picture is the ability to access bottom/terrain data and render those data in real time. For example, any submarine-based tactical system must access information from the submarine's combat control system (CCS) databases. An onboard bathymetry database used in support of the Common Tactical Picture (CTP) is the NIMA product Digital Nautical Chart (DNC). The DNC is an unclassified, vector-based digital database containing maritime features essential for safe marine navigation. The database consists of a portfolio of approximately 5000 nautical charts that provide global marine navigation between 84° North latitude and 81° South latitude and supports a variety of Geographic Information System (GIS) applications. NIMA has produced the DNC to support worldwide navigation requirements of the U.S. Navy and U.S. Coast Guard.

In addition to bathymetry the DNC database contains nautical features consisting of points, lines, and polygons. These features have been collected individually and assembled to support its use by GIS and other scientific applications.

The size of both modeled and measured data in the DNC database presents a challenge to computer's ability to extract the data and visualize it at interactive speed. Older methods of visualization relied on heavy post-processing of the data into image files that could be played back as movies or plotted and studied for future use. These methods were slow and failed to fully exploit the information value of the data. There are varied efforts underway to progress toward interactive visualization. For example, tools exist for comparing multivariate data sets to imagery data sets in both geographic and multivariate feature space. An example tool supports various input data formats, allows visualization in three data spaces, active querying with text output in two data spaces, selection of areas, and manual classification in two data spaces. Still, graphics systems of mid-end workstations often cannot render the geometry fast enough to be interactive.

U.S. Pat. No. 6,515,663 to Hung et al. describes a method and apparatus for the efficient rendering of a three-dimensional object on a flat screen in stereo 3-D such that the left and right eyes can view two different images (i.e. the same object from slightly different viewpoints), making the image appear to extend out of the screen and into real three-dimensional space.

U.S. Pat. No. 6,556,194 to Shiono describes a method of combining partial descriptions of a three-dimensional object, obtained from different perspectives, and merging that data into a single, complete description of that object, valid from all perspectives. The method defines shape vectors using ranges and directions from the surface points. The various sets of shape vectors from differing perspectives are then merged through vector arithmetic, yielding a single, unified shape vector description of the object.

U.S. Pat. No. 6,563,500 to Kim et al describes a method and apparatus for the efficient coding and decoding of a 3-D triangle mesh dataset for the purpose of transmission. The method attempts to speed transmission by coding to allow the receiving end to begin mesh reconstruction before the entire dataset is received, and also allowing partial reconstruction even if there is lost data. The method basically consists of taking a complete 3-D mesh dataset, splitting it into chunks, encoding it, sending it, receiving it, decoding it, and recombining it. The mesh is split along natural "fault lines" as opposed to arbitrary division lines, chosen to make the pieces regular in size and shape.

U.S. Pat. No. 6,606,089 to Margadant describes a method of visualizing spatially resolved data by means of a superposition of texture maps. The method involves taking sampled three-dimensional data, loading it as texture maps (a two-dimensional surface that is "wrapped around" a three-dimensional object, giving the 3-D object a surface texture similar to that of the 2-D surface, analogous to applying wallpaper, paint, or veneer to a real object, and then allowing the graphics rendering hardware to superpose these maps to rapidly create a pictorial representation of the data). The method avoids rendering a complete mesh description of the object and instead rapidly generates pictures of the data.

None of the foregoing approaches are well-suited for DNC data which requires "direct read" software that provides for display without data manipulation. The present invention finds that "direct read" is possible by extraction of all information (including both navigational and bathymetric information) generated from the DNC database, and generating a three-dimensional triangle mesh description of sampled data. The present system as will be disclosed integrates and combines bathymetric/topographic data from several sources operating on ordinary desktop personal computers, saving development time and associated expenses in addition to providing for widespread portability.

SUMMARY OF THE INVENTION

It is, therefore, a primary object of the present invention to provide a method for integrating and combining bathymetric/topographic data from several sources operating on ordinary desktop personal computers.

It is a further object of the present invention to provide a methodology for integrating and overlapping bathymetry/topographic data points into a regularly sized rendering tile in which the data points are not overlapping but are accurately representing the sampling density of the extracted data points.

It is a still further object of the present invention to provide a method for extracting and rendering data from digital charting databases as described above by constructing a library that can easily be modified to accommodate other data sets, both in situ and archival.

It is a still further object of the present invention to provide a method as described above which is capable of use by the general public as well as the military because it is designed to work with both classified and unclassified bathymetric/topographic databases for oceanography, terrain mapping and even mapping of extraterrestrial bodies, etc.

These and other objects of the present invention are accomplished by a method for extracting and rendering data from digital charting databases. The method is preferably implemented in software form generally by integrating and combining bathymetric/topographic data from several sources into a stream of three-dimensional data points, creating a triangle surface mesh, and dividing it into pieces along arbitrary lines to create regularly sized and shaped areas for efficient storing and rendering. The method works by forming an initial triangle mesh of the area and then refining the mesh by incrementally adding each point to the mesh, until a full mesh representation is achieved. The large single-mesh is then broken down into discrete geographic regions, and the region data is converted into a standard file format for viewing and/or processing.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a method for extracting and rendering data from digital charting databases. The method is readily implemented in software form for use on a conventional computer workstation with an appropriate operating system. The computer workstation may be, for example, a conventional personal computer with standard internal components (e.g. a microprocessor with peripheral chipset mounted on an appropriate motherboard). Of course, other more or less powerful computer systems can be used, but it is suggested that the computer system meet the minimum system requirements for intense video applications such as gaming. The user interface is preferably a conventional color monitor and standard input devices such as a keyboard and mouse. The operating system is preferably LINUX 9.0 based or another operating adaptive and known to those skilled in the art. The software of the present invention may be compressed onto one or more installation disks and may be loaded onto a computer system as described above using conventional installation macros such as those provided with the aforementioned operating systems.

Figure 1:
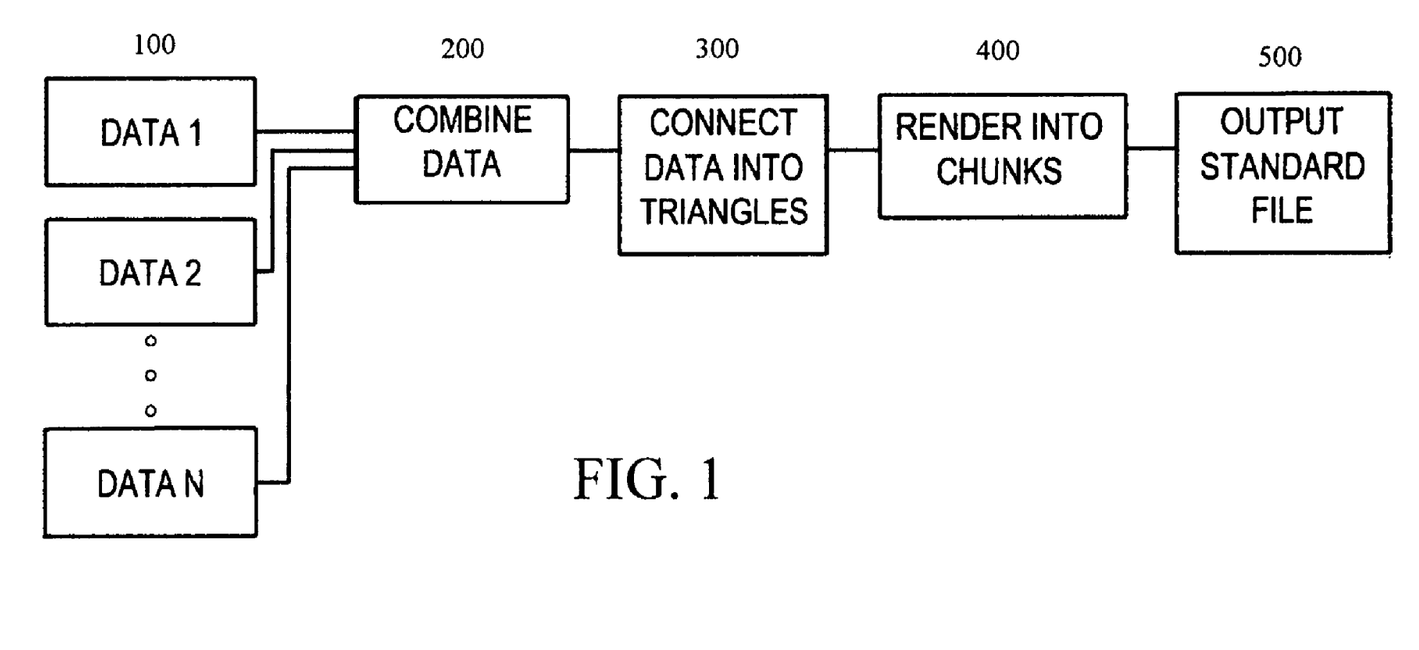
FIG. 1 is a flow chart of a method for extracting and rendering data from digital charting databases according to a primary embodiment of the present invention.

FIG. 1 is a top level flow chart delineating the basic steps required to perform the method of the present invention. At step 100, bathymetric/topographic data is taken from several data sources DATA1.N.

At step 200, the data from DATA1..N is combined into a single stream of three-dimensional data points. This entails combining the data points and sorting all points by the x or y coordinate.

At step 300, the combined and sorted data from DATA1.N is connected in triangles, forming an initial triangle mesh of the area. This artificial starting mesh comprises a single triangle that completely bounds the input data. The triangle mesh is refined by incrementally adding each streaming point from step 200 to the mesh, until a full mesh representation is achieved. Next, at step 400, the large-file data is "rendered into chunks", e.g., broken down into geographic regions of a predetermined fixed size.

Finally, at step 500 the rendered data is converted to a standard file format such as "Open Inventor" or other known format for visualization.

Steps 100-500 are described below in more detail.

Step 100: Importing bathymetric/topographic data from several data sources DATA1.N.

The software imports three dimensional coordinate data from one or multiple sources, including the DNC database and others. Consequently, the collective data can have gaps and overlaps. More data provides additional detail.

Step 200: Combining data into a single stream of three-dimensional data points ("streaming points").

The data from multiple sources is converted to x, y, and z coordinate data and is combined into one large file for processing.

Step 300: Form initial triangle mesh of the area.

Figure 2:
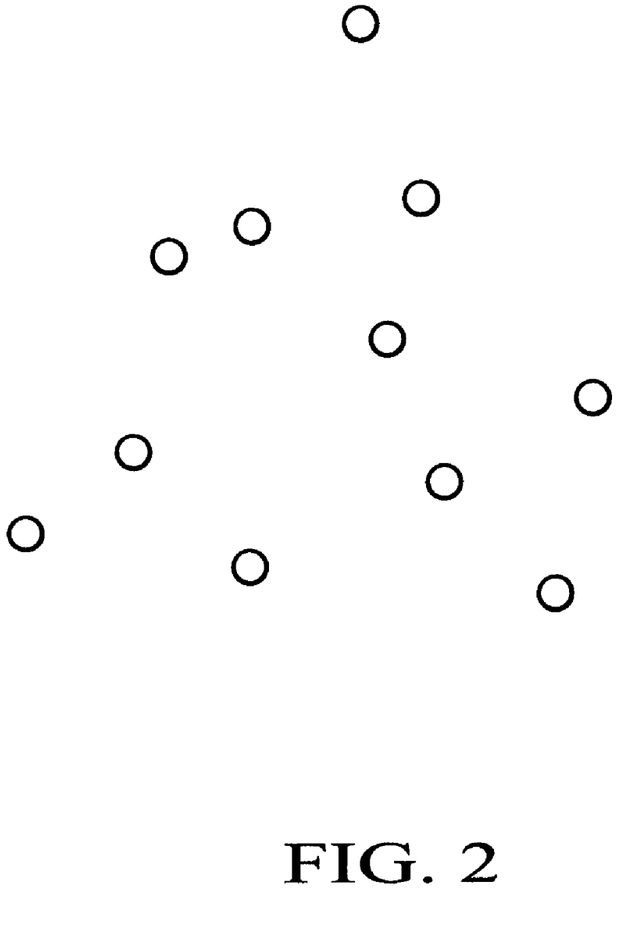
FIGS. 2-13 are sequential geometric drawings illustrating the method steps 100-500 as described below.

The combined single-file data is connected into a triangle mesh surface in order to make an artificial starting mesh consisting of a single triangle that completely bounds the input data. This can be done using the following algorithm:

1st. The combined data is sorted by the coordinates of the largest dimension (x, y or z) so that triangles can be created along a moving front. FIG. 2 illustrates a combined datafile in which the largest dimension is X. This data would be sorted along the X axis, which reduces the number of calculations. For the purposes of this function, the Y and Z dimensions are ignored.

Figure 3:
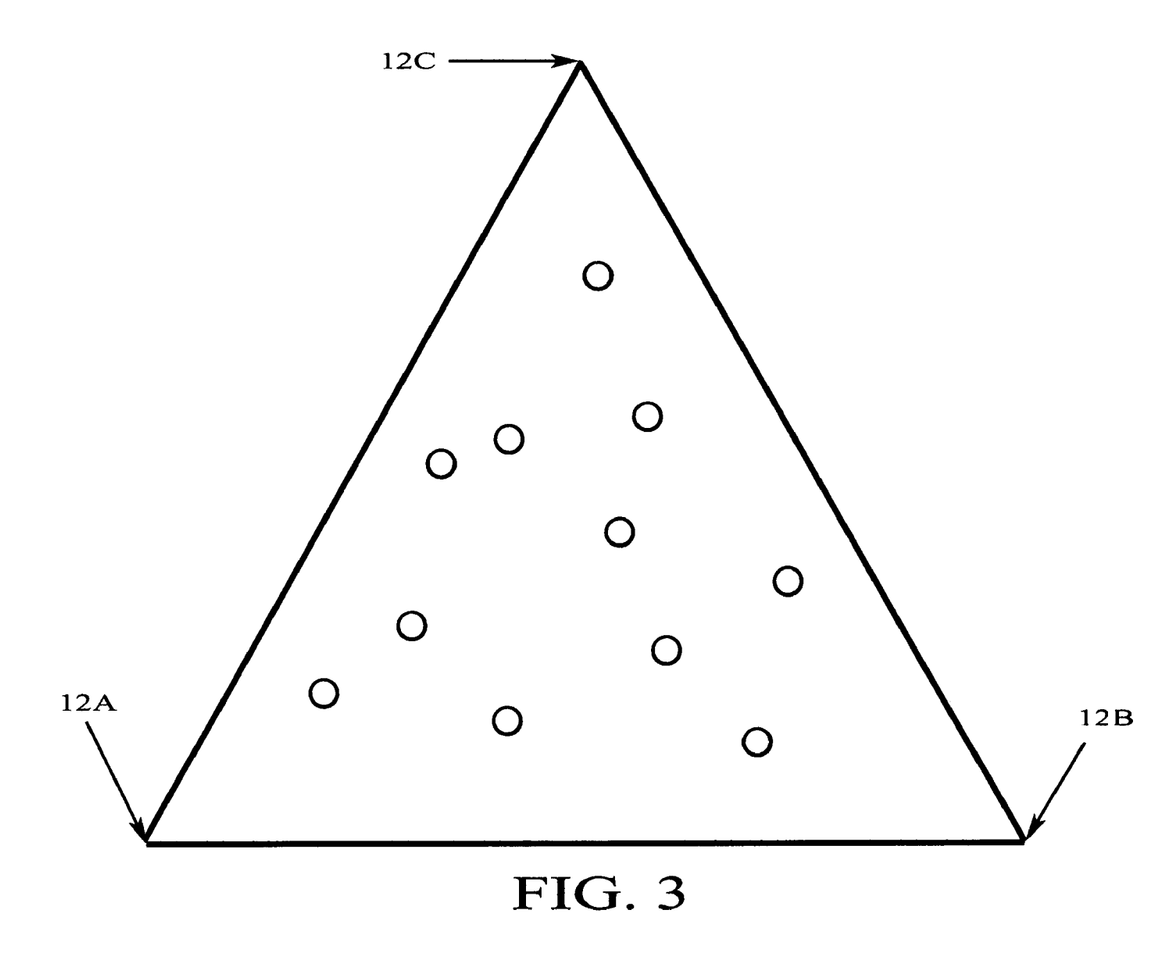

2nd. Calculate an encompassing triangle 10 by creating virtual vertices 12A, 12B, and 12C as shown in FIG. 3. An exemplary set of code for performing this function may be written in Borland Turbo C and is provided as follows:

```
float dx=maxx−minx;
float dy=max_y−min_y;
float dmax = max(dx, dy);
float xmid= (minx+maxx)/2.0;
float ymid= (min_y+max_y)/2.0;
pt1.x = xmid − 2.0 * dmax;
pt1.y = ymid − dmax;
pt1.z = 0.0;
pt3.x = xmid;
pt3.y = ymid + 2.0 * dmax;
pt3.z = 0.0;
pt2.x = xmid + 2.0 * dmax;
pt2.y = ymid − dmax;
pt2.z = 0.0;
```

Figure 4:
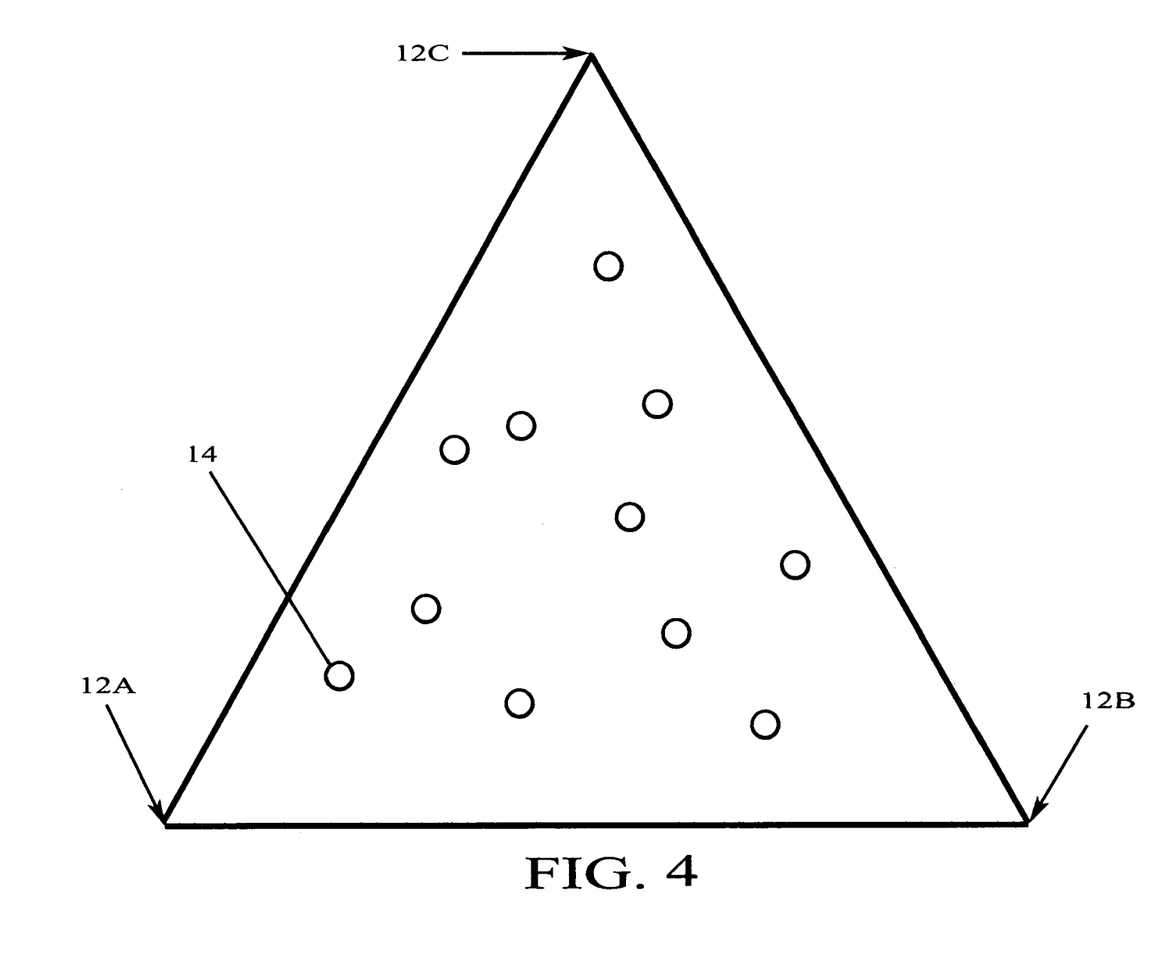

3rd. Start with a point having an extreme value in the sorted dimension X. In FIG. 4 this would be no. 14.

Figure 5:
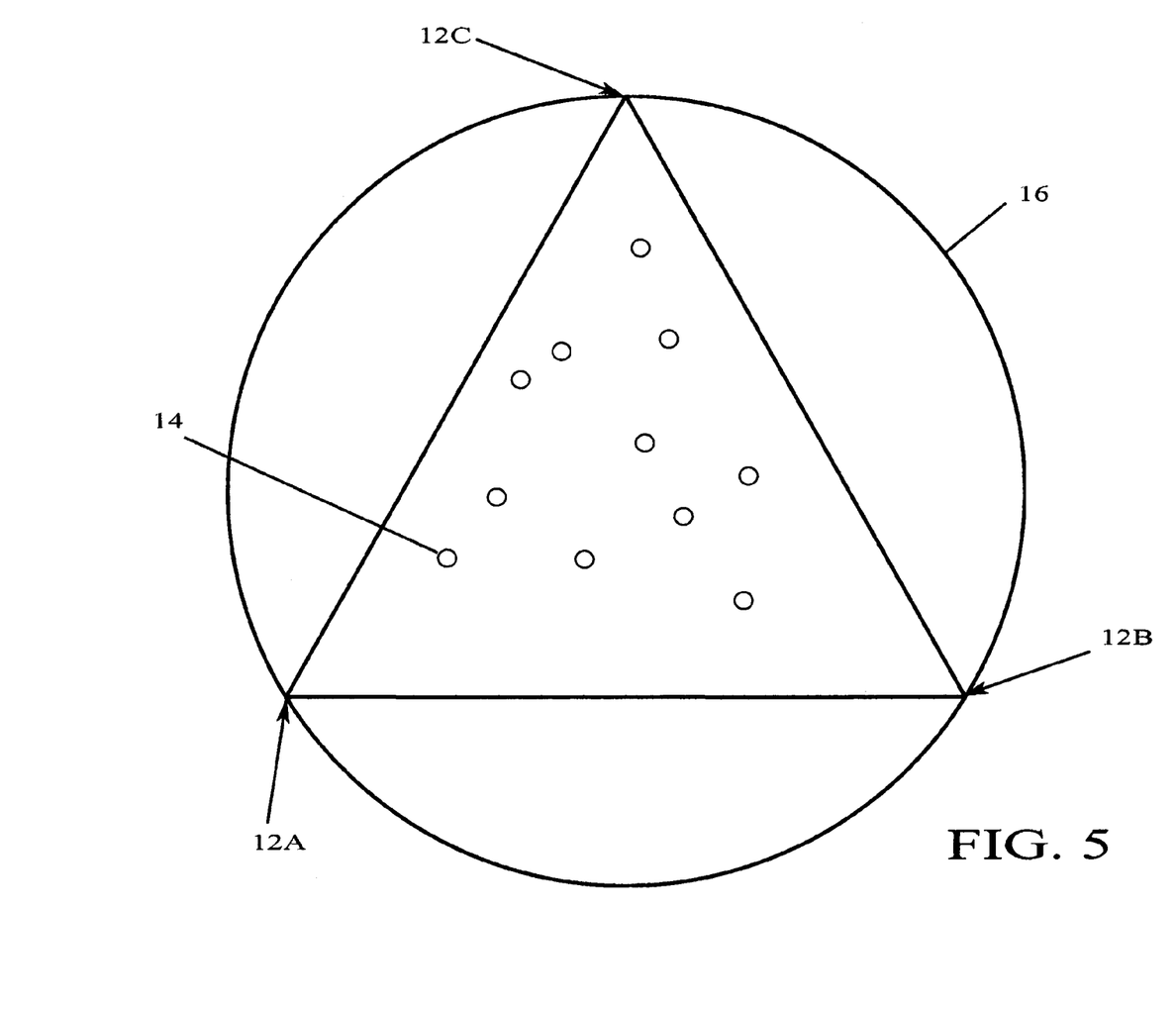
Figure 6:
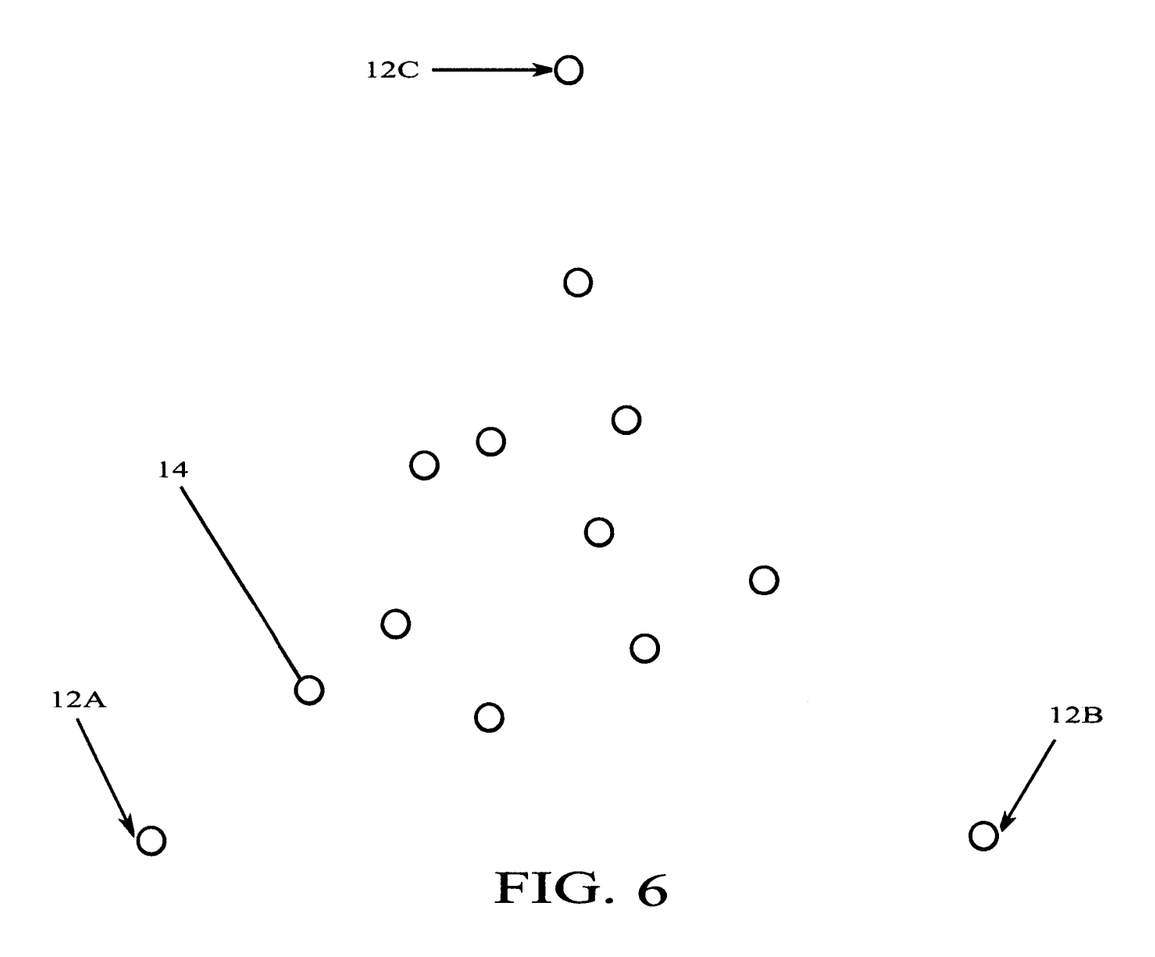
Figure 7:
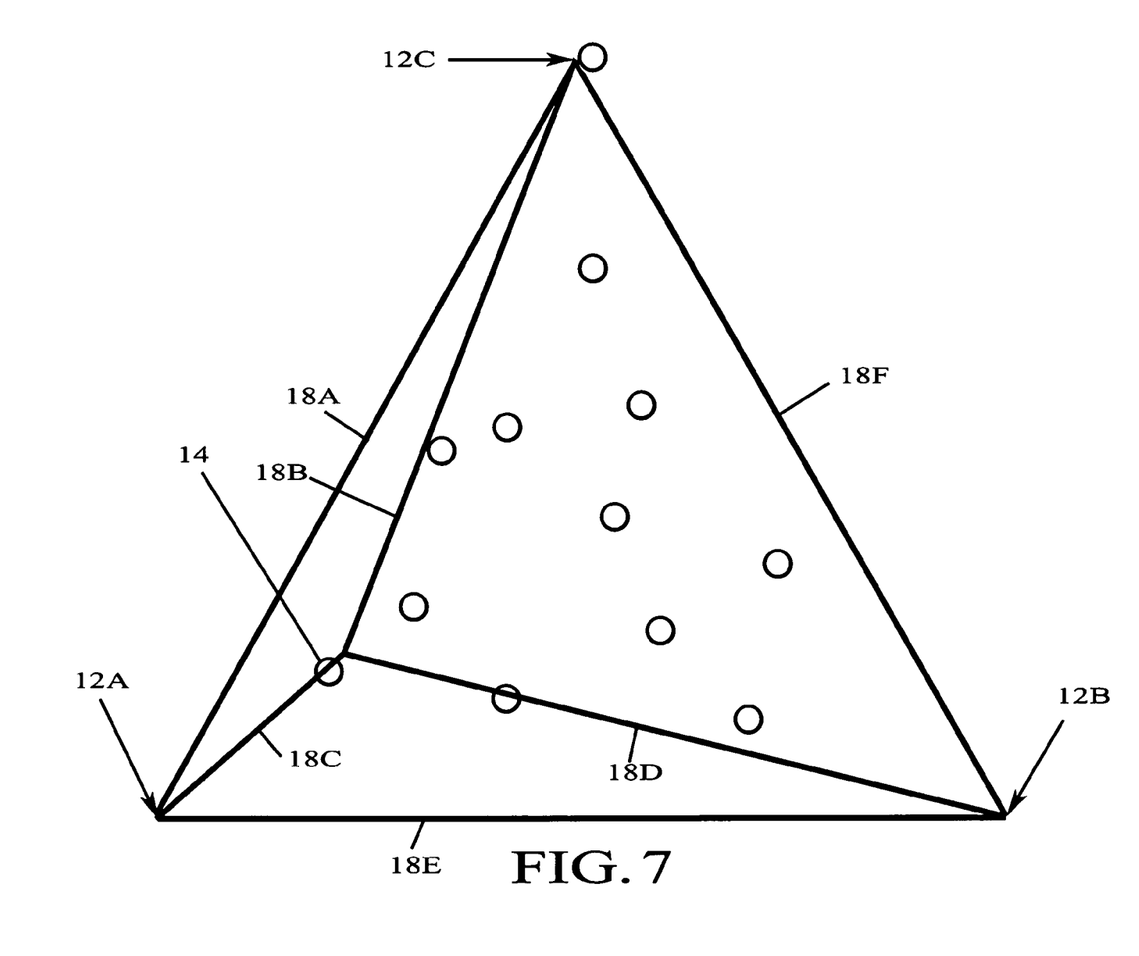
Figure 8:
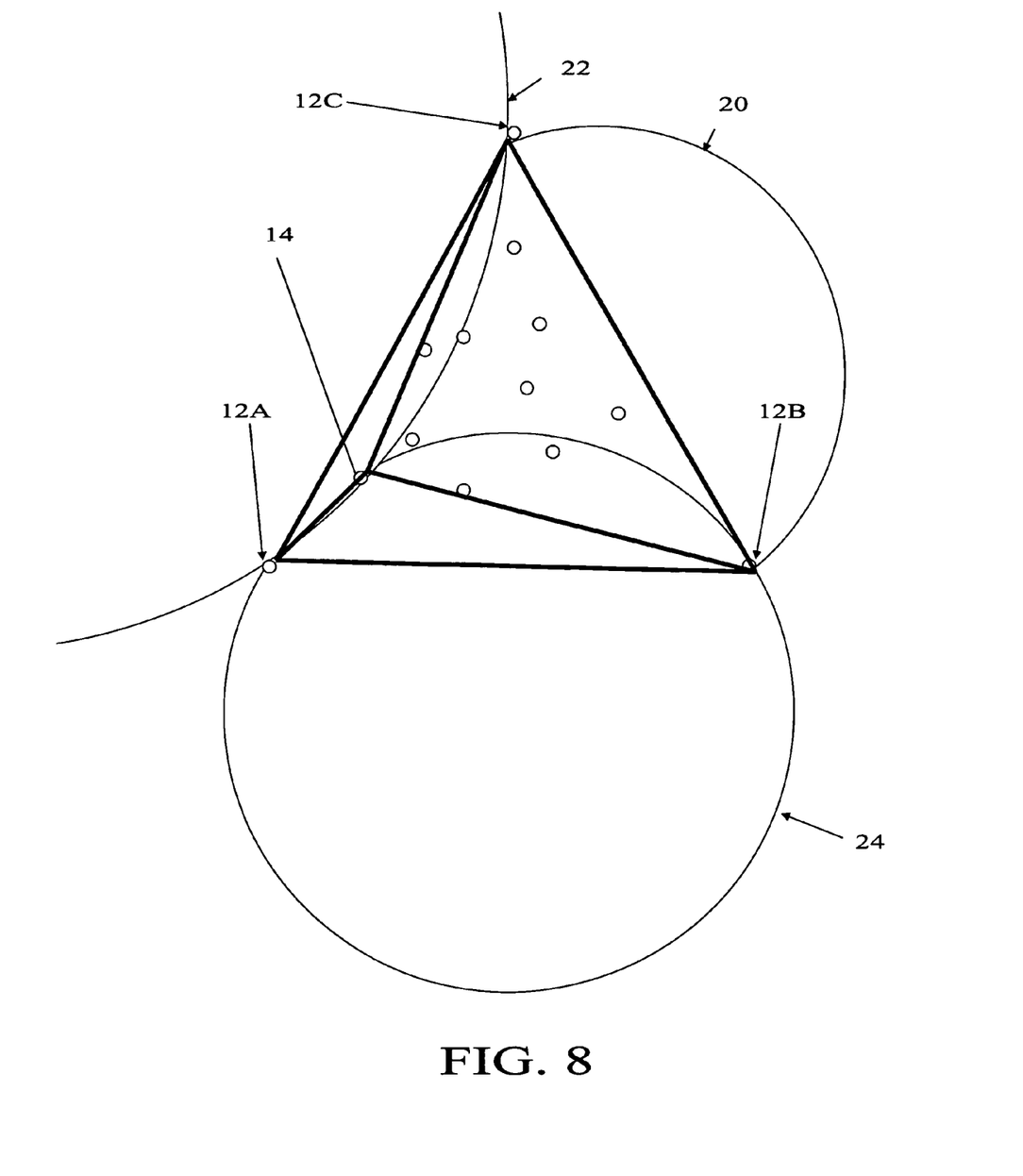

4th. Beginning with point 14, and for each point moving inward along X, perform the following substeps. Remove triangles from consideration if the point's X coordinate is greater than the sum of the x-coordinate of the center of the triangle's circumcircle+the radius of the circumcircle. The circumcircle is a triangle's circumscribed circle, i.e., the unique circle that passes through each of the triangles three virtual vertices 12A, 12B, and 12C. The center of the circumcircle is called the circumcenter, and the circle's radius R is called the circumradius.

b. Make a list of triangles which include the point 14. These would be the triangle with vertices 12A, 12B, and 12C in FIG. 5.

c. Make list of triangles whose circumcircle includes point 14, but do not contain point 14 themselves (these triangles will be used in step f). No triangle meets this criteria.

d. Remove all triangles that include the point 14. See FIG. 6.

e. Construct new triangles by drawing lines between the point 14 and the vertices of the removed triangles. FIG. 7 shows this in the basic case.

f. Tentatively remove all bordering triangles whose circumcircles include the point 14 (the triangles found in step c).

g. Construct trial triangles from point 14 to each tentatively removed triangle vertex.

h. Test for overlap of the newly created triangles by seeing if the constructed line crosses a previously drawn line.

i. If no overlap then confirm the new triangles and remove the old triangles.

ii. If overlap then restore the tentatively removed triangle causing the new line to overlap and remove overlapping line.

i. Add new triangles. In FIG. 7, these are the triangles having sides 18A, 18B, and 18C; 18C, 18D, and 18E; and 18B, 18D, and 18F.

j. Calculate circumcircles. FIG. 8 shows the circumcircles 20, 22 and 24.

Figure 9:
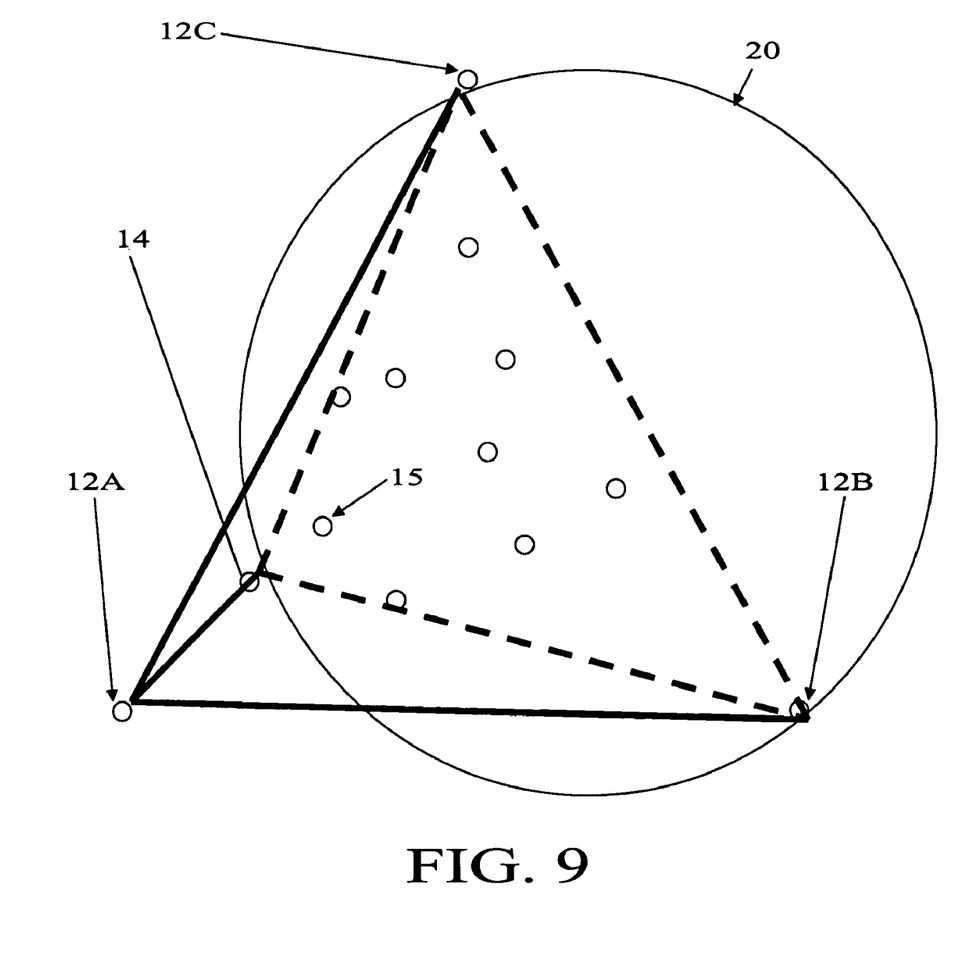
Figure 10:
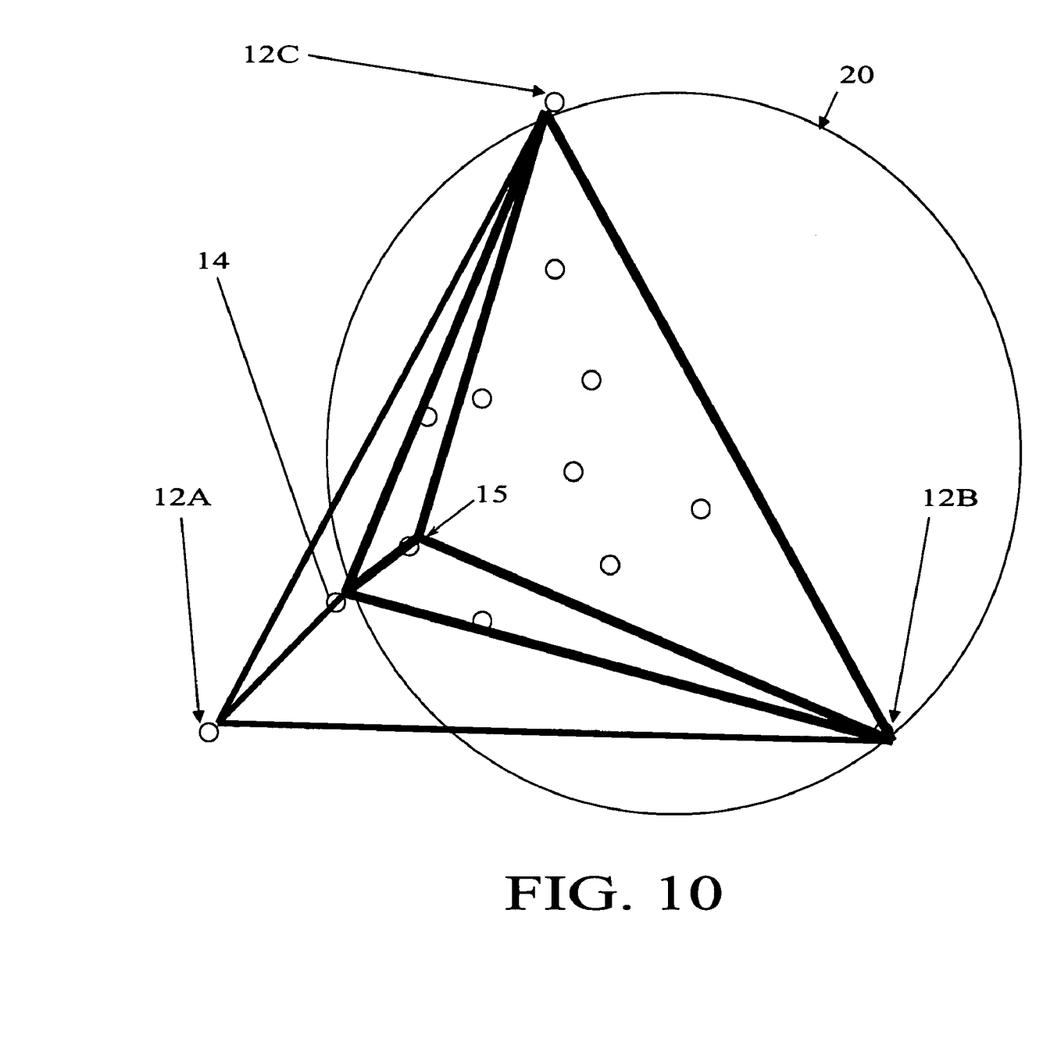
Figure 11:
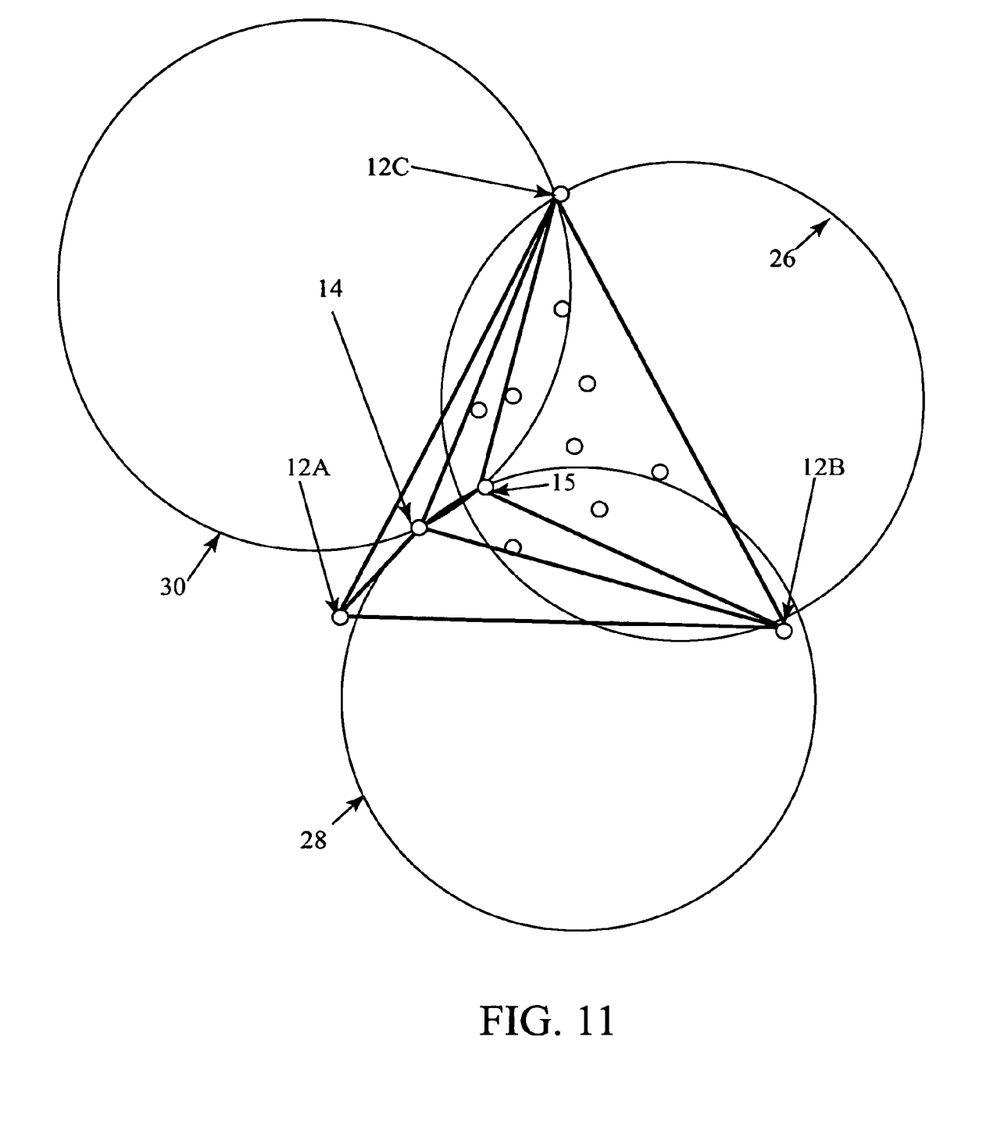
Figure 12:
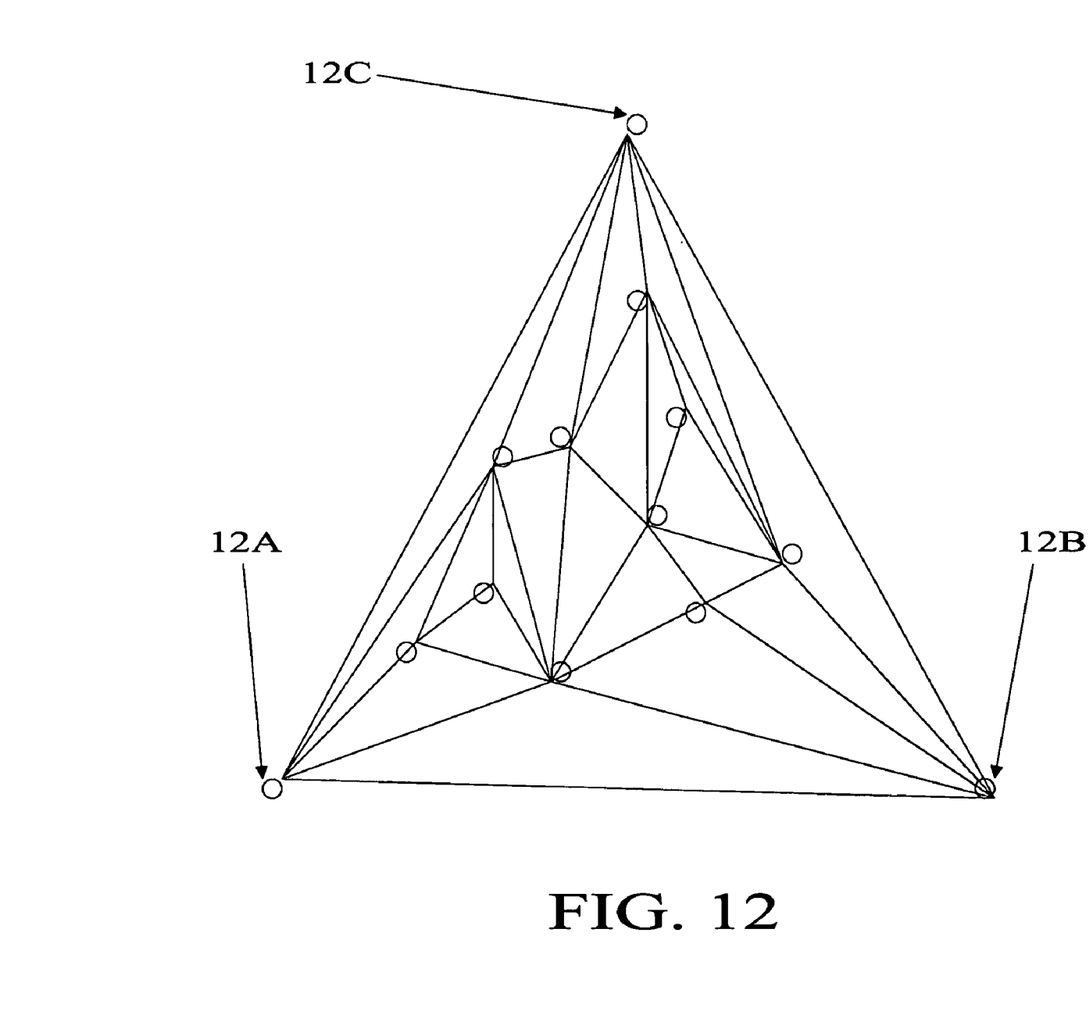

5th. Move on to the next point (point 15). FIGS. 9, 10 and 11 show the continuation of this process. Upon completion of the process, FIG. 12 is obtained.

Figure 13:
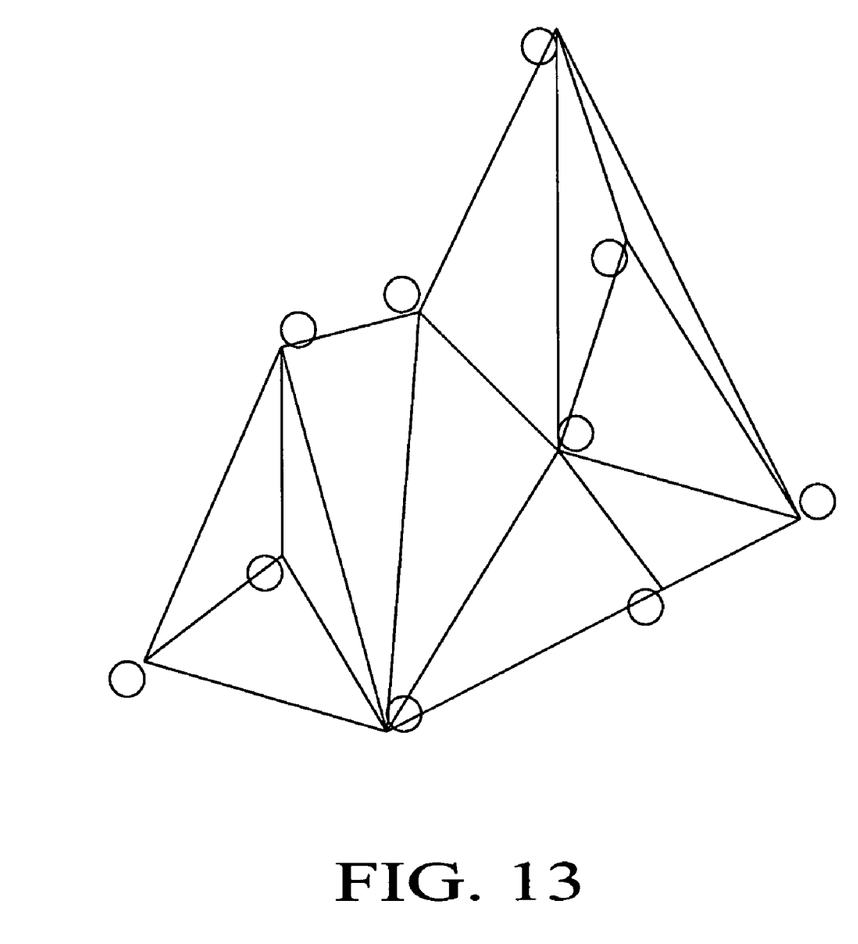

6th. Remove all triangles joined to virtual points (e.g., 12A, 12B, and 12C). From FIG. 12, points 12A, 12B and 12C are removed along with all connecting lines resulting in FIG. 13.

Step 400: Render into chunks.

Creation of the triangular mesh per steps 100-300 above creates a large file that must be broken down into geographic region. This is accomplished with the following substeps.

1st. Take points beyond tile size

2nd. Apply four clipping planes—one each for the northern, southern, eastern, and western extremes of the desired tile area.

3rd. Create linear interpolated points where clipping planes intersect. These points will not be visible.

4th. Remove all points and triangles beyond the bounds of the tile. This will leave a regularly-shaped triangular mesh that covers exactly the tile area specified.

Step 500: Convert to a standard file format.

The files are then converted into a standard file format. For the uses of this invention the standard format is OPEN INVENTOR (or comparable system known to those skilled in the art) an object-oriented 3-D toolkit offering a comprehensive solution to interactive graphics programming problems. The format presents a programming model based on a 3-D scene database that simplifies graphics programming.

The above-described method for integrating and combining bathymetric/topographic data from several sources into a regularly sized rendering tile in which the data points are not overlapping but are accurately representing the sampling density of the extracted data points constructs a library that can easily be modified to accommodate other data sets, both in-situ and archival. The method works with both classified and unclassified bathymetric/topographic databases for oceanography, terrain mapping and even mapping of extra-terrestrial bodies, etc.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method for extracting and rendering data from digital charting databases, comprising the steps of:

combining data from a plurality of databases into a single database of three-dimensional (x,y,z) data points;

sorting said database of three-dimensional (x,y,z) data points along one axis;

creating a triangle surface mesh encompassing all of said database of three-dimensional (x,y,z) data points;

adding each three-dimensional (x,y,z) data point incrementally to said triangle surface mesh until a full triangle mesh representation is achieved;

dividing said triangle surface mesh into pieces along arbitrary lines to create discrete areas of predetermined size for efficient storing and rendering; and converting said triangle surface mesh into a standard file format;

wherein said step of creating a triangle surface mesh encompassing all of said database of three-dimensional (x,y,z) data points further comprises connecting combined single-file data into a triangle mesh surface creating an artificial mesh surface consisting of a single triangle completely bounding the three-dimensional (x,y,z) data points.

2. A method in accordance with claim 1 wherein said step of connecting combined single-file data further comprises the substeps of:

sorting said combined single-file data by coordinates of largest dimension (x, y or z) to create triangle along a moving front;

calculating an encompassing triangle by creating three virtual vertices;

moving point by point along said sorted single-file data, beginning with a particular point having an extreme value in said sorted dimension;

removing all triangles joined to virtual points; and removing all connecting lines that results in a large file.

3. A method in accordance with claim 2 wherein said substep of moving point by point along the sorted dimension further comprises removing a triangle from consideration if a horizontal coordinate of a point is greater than a sum of said horizontal coordinate of the center of a circumcircle of said triangle plus the radius of said circumcircle.

4. A method in accordance with claim 3 wherein said substep of moving point by point along the sorted dimension further comprises making a list of triangles which include said point having an extreme value in the sorted dimension.

5. A method in accordance with claim 4 wherein said substep of moving point by point along the sorted dimension further comprises listing triangles in which said circumcircle includes said point having an extreme value but does not contain said point having an extreme value, and removing all triangles with circumcircles including said point having an extreme value.

6. A method for extracting and rendering data from digital charting databases, comprising the steps of:

combining data from a plurality of databases into a single database of three-dimensional (x,y,z) data points;

sorting said database of three-dimensional (x,y,z) data points along one axis;

creating a triangle surface mesh encompassing all of said database of three-dimensional (x,y,z) data points;

adding each three-dimensional (x,y,z) data point incrementally to said triangle surface mesh until a full triangle mesh representation is achieved;

dividing said triangle surface mesh into pieces along arbitrary lines to create discrete areas of predetermined size for efficient storing and rendering; and converting said triangle surface mesh into a standard file format;

wherein said step of dividing said triangle surface mesh further comprises the substep of breaking down said large file into geographic regions and wherein said substep of breaking down said large file into geographic regions further comprises selecting points beyond a determined tile size, applying four clipping planes to said points, creating linear interpolated points where said clipping planes intersect and removing all points and triangles beyond bounds of said tile size leaving a regularly-shaped triangular mesh that covers said tile size.

\* \* \* \* \*